United States Patent
Campbell et al.

(10) Patent No.: US 11,306,211 B2
(45) Date of Patent: Apr. 19, 2022

(54) POROSITY REDUCTION BY ENCAPSULATED POLYMERIZING AGENTS

(71) Applicant: International Business Machines Corporation, Armonk, NY (US)

(72) Inventors: Eric J. Campbell, Rochester, MN (US); Sarah K. Czaplewski-Campbell, Rochester, MN (US); Brandon M. Kobilka, Fishkill, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 16/546,496

(22) Filed: Aug. 21, 2019

(65) Prior Publication Data

US 2021/0054215 A1 Feb. 25, 2021

(51) Int. Cl.
*B33Y 10/00* (2015.01)
*B33Y 50/02* (2015.01)
*B29C 64/153* (2017.01)
*B29C 64/393* (2017.01)
*C09D 4/06* (2006.01)
*C09D 5/03* (2006.01)
(Continued)

(52) U.S. Cl.
CPC ............. *C09D 4/06* (2013.01); *B29C 64/153* (2017.08); *B33Y 10/00* (2014.12); *B33Y 70/00* (2014.12); *B33Y 80/00* (2014.12); *C09D 5/031* (2013.01); *C09D 177/00* (2013.01); *B29C 64/393* (2017.08); *B29K 2077/00* (2013.01); *B29K 2105/0076* (2013.01); *B33Y 50/02* (2014.12)

(58) Field of Classification Search
CPC .. C09D 5/031; C09D 177/00; B29K 2077/00; B29K 2105/0076; B29C 64/153; B29C 64/393; B33Y 10/00
See application file for complete search history.

(56) References Cited

U.S. PATENT DOCUMENTS

| | | |
|---|---|---|
| 5,149,548 A | 9/1992 | Yamane et al. |
| 5,342,919 A | 8/1994 | Dickens, Jr. et al. |

(Continued)

OTHER PUBLICATIONS

Bajric, S., "Selective Laser Sintering of PA2200: Effects of print parameters on density, accuracy, and surface roughness," GRA paper, Jun. 12, 2017, 15 pages, Los Alamos National Laboratory.

(Continued)

*Primary Examiner* — Michael P Wieczorek
(74) *Attorney, Agent, or Firm* — Kelsey M. Skodje (57) ABSTRACT

A method, composition, and article of manufacture. The method can include depositing a layer, which includes a set of particles and a set of microcapsules encapsulating polymerizing agents. The method can also include fusing particles in selected areas of the layer with a laser, and rupturing at least a portion of microcapsules using at least one energy source selected from the laser, an ultraviolet (UV) radiation source, and a heat source. The composition can include a set of particles and a set of microcapsules, each containing a polymerizing agent encapsulated by a degradable shell. The article of manufacture can include fused layers that include fused particles and pores sealed in reactions with polymerizing agents released from degradable microcapsules.

10 Claims, 8 Drawing Sheets

(51) Int. Cl.
  *C09D 177/00* (2006.01)
  *B33Y 70/00* (2020.01)
  *B33Y 80/00* (2015.01)
  *B29K 105/00* (2006.01)
  *B29K 77/00* (2006.01)

(56) References Cited

U.S. PATENT DOCUMENTS

| | | | |
|---|---|---|---|
| 7,070,734 B2 | 7/2006 | Liu et al. | |
| 7,077,638 B2 | 7/2006 | Leyden et al. | |
| 8,119,238 B2 * | 2/2012 | Parrish | B05D 5/005 428/402.24 |
| 8,574,485 B2 | 11/2013 | Kramer et al. | |
| 8,637,592 B2 | 1/2014 | Jobmann et al. | |
| 8,822,618 B2 | 9/2014 | Okawa et al. | |
| 8,829,082 B2 | 9/2014 | Boday et al. | |
| 9,089,830 B2 | 7/2015 | Marteaux et al. | |
| 9,193,129 B2 * | 11/2015 | Rogalski | B29C 65/486 |
| 9,694,337 B2 | 7/2017 | Boday et al. | |
| 9,793,528 B2 | 10/2017 | Ka et al. | |
| 10,072,185 B2 | 9/2018 | Campbell et al. | |
| 2006/0198916 A1 | 9/2006 | Beeck et al. | |
| 2011/0008293 A1 | 1/2011 | Bhandari | |
| 2012/0253000 A1 | 10/2012 | Okawa et al. | |
| 2013/0338280 A1 | 12/2013 | Boday et al. | |
| 2015/0231588 A1 | 8/2015 | Moore et al. | |
| 2016/0289484 A1 | 10/2016 | Lalgudi et al. | |
| 2016/0366728 A1 | 12/2016 | Folgar et al. | |
| 2017/0158886 A1 | 6/2017 | Odarczenko et al. | |
| 2017/0241849 A1 | 8/2017 | King et al. | |
| 2017/0259504 A1 | 9/2017 | Lin et al. | |
| 2020/0062669 A1 | 2/2020 | Bum et al. | |

OTHER PUBLICATIONS

Duck et al., "Infiltration as post-processing of laser sintered metal parts," Powder Technology 145 (2004), pp. 62-68.

Wilson et al., "Evaluation of Peroxide Initiators for Radical Polymerization-Based Self-Healing Applications," Journal of Polymer Science: Part A: Polymer Chemistry, vol. 48, pp. 2698-2708, 2010.

Sanders et al., "Stereolithographic 3D printing of extrinsically self-healing composites," Scientific Reports, Jan. 23, 2019, pp. 1-6, DOI: 10.1038/s41598-018-36828-9.

Amaral et al., "Stimuli responsive self-healing polymers: gels, elastomers and membranes," Polymer Chemistry, 2017, 8, pp. 6464-6484, Royal Society of Chemistry. https://pubs.rsc.org/en/content/articlehtml/2017/py/c7py01386h.

Backman, L., "Self-healing elastomers: Comparison of methods," Degree Thesis, 2018, 59 pages. https://www.theseus.fi/bitstream/handle/10024/144978/Backman_Linus.pdf.

Brown et al., "In situ poly(urea-formaldehyde) microencapsulation of dicyclopentadiene," Journal of Microencapsulation, Nov.-Dec. 2003, vol. 20, No. 6, pp. 719-730, Taylor&Francis.

Ghosh, S.K. (Edited), "Self-healing Materials: Fundamentals, Design Strategies, and Applications," 2009, 28 pages. https://application.wiley-vch.de/books/sample/3527318291_c01.pdf.

EOS, "Additive Manufacturing, Laser-Sintering and industrial 3D printing—Benefits and Functional Principle," PEOS Industrial 3D printing—Process, method and benefits, Printed: May 20, 2019, 4 pages. https://www.eos.info/additive_manufacturing/for_technology_interested.

Perignon et al., "Microencapsulation by interfacial polymerisation: membrane formation and structure," Journal of Microencapsulation, Early Online: 1-15, Review Article, Published Sep. 29, 2014, informa healthcare.

Tam, N T T., "Self-Healing polymer coating," ICS, Institute Charles Sadron, Accessed: Jan. 31, 2019, 45 pages.

Yuan et al., "Microencapsulation and characterization of polyamic acid microcapsules containing n-octadecane via electrospraying method," Materials Express, vol. 5, No. 6, 2015, pp. 480-488.

Mizuno et al., "Non-phosgene synthesis of benzyl chloroformate (CbzCI)," Tetrahedron Letters, vol. 43, Issue 43, Oct. 2002, pp. 7765-7767 (Abstract Only). https://www.sciencedirect.com/science/article/pii/S0040403902018348.

Kobilka et al., "Degradable Microcapsules for Porosity Reduction," U.S. Appl. No. 16/546,518, filed Aug. 21, 2019.

List of IBM Patents or Patent Applications Treated as Related, Signed Aug. 21, 2019, 2 pages.

* cited by examiner

POROSITY REDUCTION BY ENCAPSULATED POLYMERIZING AGENTS

BACKGROUND

The present disclosure relates to porosity reduction and, more specifically, to porosity reduction by controlled release of polymerizing agents from degradable microcapsules.

Self-healing materials are materials that automatically repair themselves by closing or filling in open spaces caused by damage such as cracks, tears, and punctures. For example, some self-healing materials are polymers that are able to re-form bonds and/or form new crosslinks after the damage has occurred. Other self-healing materials use polymerizing agents that are released (e.g., from mechanically ruptured microcapsules) when the material is damaged. The released polymerizing agents then polymerize and/or interact with the material (e.g., by crosslinking or partially dissolving) to repair the damaged area.

SUMMARY

Various embodiments are directed to a method that includes depositing a layer, which includes a set of particles and a set of microcapsules encapsulating polymerizing agents. The method also includes fusing particles in selected areas of the layer with a laser, and rupturing at least a portion of microcapsules using at least one energy source selected from the laser, an ultraviolet (UV) radiation source, and a heat source. The UV radiation source can expose the microcapsules to electromagnetic radiation having a wavelength below approximately 260 nm. The heat source can heat the microcapsules to a temperature of approximately 140° C.-180° C. Rupturing the microcapsules can release the polymerizing agents into pores in the selected areas of the layer. The method can also include curing the released polymerizing agents. In some embodiments, each particle has a diameter between approximately 20 μm and 200 μm. The fusing can include rastering a laser over the selected areas of the layer according to a pattern from a computer-aided design (CAD) file. The weight percent of the set of microcapsules in the layer can be approximately 2.5-5 wt %. The layer can have a thickness of approximately 0.20 mm.

Additional embodiments are directed to a composition, which includes a set of particles and a set of microcapsules. Each microcapsule includes a polymerizing agent encapsulated by a degradable shell. The degradable shell can be a polyamic acid, which can have photosensitive repeat units, and the particles can be polyamide particles. In some embodiments, each particle has a diameter between approximately 20 μm and 200 μm. The weight percent microcapsules can be approximately 2.5-5 wt %.

Further embodiments are directed to an article of manufacture, which includes fused layers. Each layer includes fused particles (e.g., laser sintered particles) and sealed pores. The sealed pores are sealed in reactions with polymerizing agents released from degradable microcapsules. These reactions can form polymers such as polyamides, polyurethanes, polyesters, and polyureas. In some embodiments, the fused particles are polyamide particles.

DETAILED DESCRIPTION

Self-healing materials are materials that automatically repair themselves by sealing open spaces caused by damage such as cracks, tears, and punctures. Self-healing materials can be repaired by intrinsic or extrinsic polymerizing agents. Intrinsic self-healing is carried out by the material itself. That is, self-healing materials can be made of polymers that are able to re-form bonds and/or form new crosslinks after the material has been damaged. Some self-healing polymers require a stimulus such as heat in order to repair damaged areas (e.g., furan-maleimide based polymers), though others can repair damaged areas without an external energy source (e.g., poly(urea-urethane) and various thiol-based polymers).

Extrinsic self-healing is carried out by polymerizing agents (e.g., solvents, polymerizable compounds, catalysts, etc.) that are separated from the bulk material until the material is damaged. For example, polymerizing agents can be encapsulated by microcapsules, which are embedded in the bulk material. When the material is damaged, at least a portion of the microcapsule shells are mechanically ruptured. This releases the polymerizing agents into cracks or other openings caused by the damage. The polymerizing agents then polymerize and/or interact with the polymeric bulk material to repair the damaged area.

However, because these microcapsule shells must be mechanically ruptured, the polymerizing agents can only be released when sufficient force is applied. Further, the thickness of the microcapsule shells must be carefully controlled in order to prevent the capsules from breaking during normal handling of the material. These requirements limit the types of applications that can use encapsulated polymerizing agents. For example, mechanically rupturable microcapsules cannot be used to fill in pores or other open spaces in materials that have not been damaged by application of sufficient force.

Disclosed herein are polymerizing agents encapsulated by microcapsules having degradable shells, which can be ruptured without application of mechanical force. The shells are made of polymers that degrade when exposed to laser energy, heat/infrared radiation, and/or UV light. Therefore, exposing the microcapsules to energy sources such as these causes the shells to degrade, rupturing the microcapsules. In some embodiments, other types of energy can be used (e.g., microwaves, visible light, X-rays, gamma rays, etc.). The encapsulated polymerizing agents are released when the microcapsules are ruptured. The microcapsules can be used to reduce porosity in various materials, such as plastics, rubbers, and other polymeric materials. When the microcapsules are embedded in a porous material, degrading the microcapsule shells causes the encapsulated polymerizing agents to be released into the material's pores. Reactions of the polymerizing agents and/or polymers in the porous material result in the formation of a solid polymeric material that fills and seals the pores.

In some embodiments, the rupturable microcapsules are used to reduce porosity in materials prepared by selective laser sintering (SLS). SLS is a technique for additive manufacturing wherein layers of a powder (e.g., polyamide particles) are sintered by a laser based on a computer-designed three dimensional (3D) model. The sintering fuses the particles together to form a solid. The laser sinters a layer of particles deposited on the SLS machine platform according to the 3D model pattern. The platform is then lowered, and a next layer of particles is deposited onto the sintered layer and sintered according to the same pattern. These steps are repeated until the printed object is complete.

However, SLS produces pores in the fused material, thereby mechanically weakening objects manufactured using this method. For example, laser-sintered polyamides can have about 12-16% porosity. Porosity of a completed SLS-printed object can be reduced by infiltration methods, wherein the object is submerged in a liquid metal or polymer that can be solidified in the object's exterior pores (e.g., pores near the surface of the object). However, this technique adds additional steps, time, and cost to the production of SLS-printed objects. Further, the infiltration method does not fill pores in the interior of the object. Therefore, the material is still weakened significantly by the interior porosity. Another strategy for reducing porosity involves using slower scan rates and higher laser power, but this results in increased cost and production time as well.

However, the rupturable microcapsules disclosed herein can reduce porosity in both the interior and exterior of an SLS-printed object without requiring long scan rates or higher laser powers. The rupturable microcapsules can be combined with SLS powder that is deposited on an SLS machine platform. The deposited layer is sintered, and the microcapsules are ruptured by an applied energy source. This releases the encapsulated polymerizing agents into pores in the fused material. The resulting pore-filling polymer is solidified prior to depositing the next layer of SLS powder and microcapsules. These steps can be repeated until the 3D object is complete.

Figure 1A:
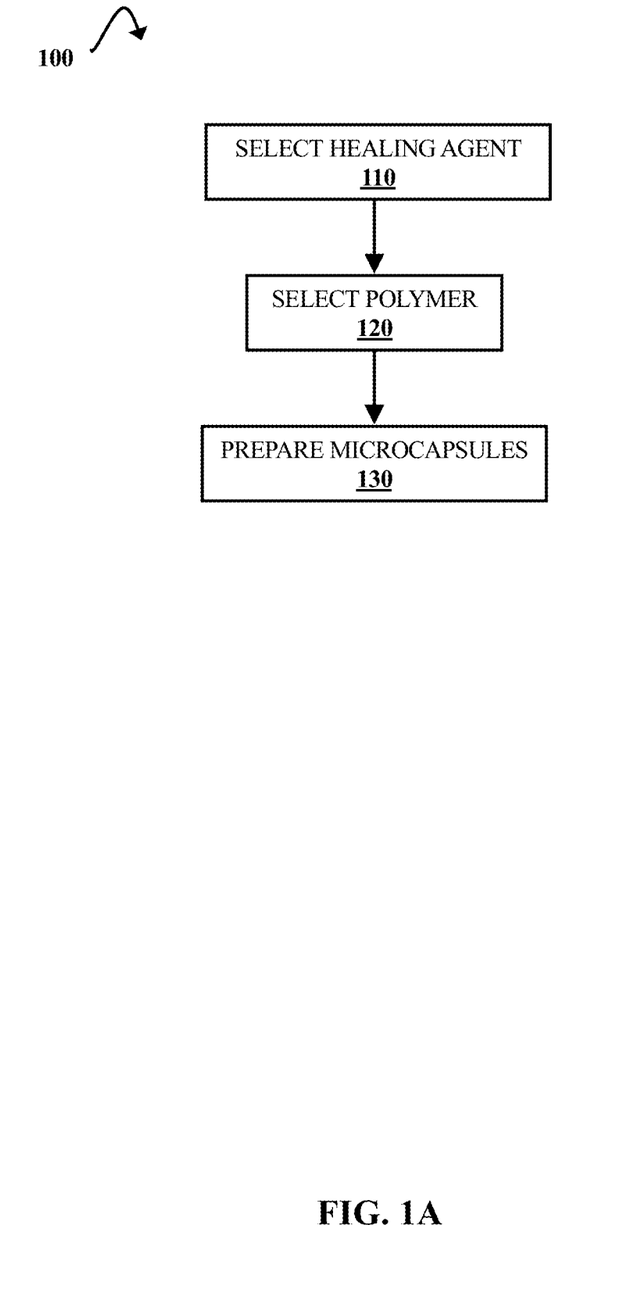
FIG. 1A is a flow diagram illustrating a process of forming rupturable microcapsules that encapsulate polymerizing agents, according to some embodiments of the present disclosure.

FIG. 1 is a flow diagram illustrating a process 100 of forming rupturable microcapsules that encapsulate polymerizing agents, according to some embodiments of the present disclosure. Rupturable microcapsules are also referred to as "microcapsules" herein. Process 100 includes the selection of a polymerizing agent. This is illustrated at step 110. Herein, "polymerizing agent" refers to any encapsulated reagent involved in reactions to seal (e.g., fill in or otherwise repair) open spaces (e.g., pores, cracks, etc.) in polymeric materials.

Examples of polymerizing agents can include polymerizable compounds such as dicyclopentadiene (DCPD), norbornene and/or its substituted analogues, cyclooctadiene and/or its substituted analogues, lactones, acrylates, acrylic acids, styrenes, isoprene, butadiene, hydroxyl-functionalized isocyanates, epoxies, polymethylmethacrylate (PMMA) chains, thiols, polydimethylsiloxane, etc. In some embodiments, combinations of microcapsules containing different reagents are used. For example, combinations of separately encapsulated diamines and diacid chlorides can react to form polyamides upon release from their respective microcapsules. Similarly, separately encapsulated diols/diisocyanates or diamines/bischloroformates can form polyurethanes, diols/diacid chlorides can form polyesters, and diamines/diisocyanates can form polyureas.

Additional examples of polymerizing agents that can be encapsulated by degradable polymer shells include protic solvents, aprotic solvents, or mixtures thereof. These solvents can include anisole, dimethylsulfoxide (DMSO), nitrobenzene, etc. Solvent-based polymerizing agents work by partially dissolving the polymeric material surrounding a pore. The dissolved area is then repolymerized to fill in the pore. In some embodiments, a polymerizable compound can be combined with a solvent such as a healing solvent or a carrier solvent. This can facilitate reactions between polymerizable compounds and the surrounding polymeric material.

The polymerizing agent polymerization reactions can also require reagents such as catalysts or initiators. If so, rupturable microcapsules containing the additional reagents can be used in combination with the microcapsules containing the polymerizable compounds and/or solvents. Some examples of additional reagents can include DCPD/tungsten(VI) chloride or Grubbs' catalyst, polydimethylsiloxane/tin catalyst, epoxy (e.g., epoxy vinyl ester)/peroxide initiators (e.g., benzol peroxide, lauroyl peroxide, methyl ethyl ketone peroxide, tent-butyl peroxide, tent- butyl peroxybenzoate, etc.), aniline-based activators (e.g., 4,4'-methylene bis(N,N-dimethyl aniline), 4,N,N-trimethylaniline, N,N-dimethyl-aniline, etc.), radical initiators (e.g., benzoyl peroxide or 2,2'-azo-bis-isobutyrylnitrile (AIBN)), ionic initiators (e.g., butyl lithium or aluminum trichloride), or Zeigler-Natta catalysts. Additional examples can include epoxy polymerization catalysts and/or accelerators (e.g., tertiary amines, Lewis acids, boron trifluoride- or boron trichloride-amine complexes, benzyl dimethyl amine (BDMA), imidazoles, boric acid esters, etc.). Combinations of appropriate polymerizing agents are known to persons of ordinary skill in the art.

A degradable polymer capable of forming the rupturable microcapsule shell is selected. This is illustrated at step 120. However, it should be noted that step 120 can be carried out before or at the same time as step 110 in other embodiments. Degradable polymers can include light- and or heat-sensitive polymers. Additionally, various polymers can form microcapsule shells that can be degraded by laser energy.

For example, polymers that can form laser-degradable shells can include polyamides, polyurethanes, polyureas, polyesters, urea-formaldehydes, melamine-formaldehyde/melamine-urea-formaldehydes (MF/MUF), etc. The degradable shell can also be made of a polymer that degrades upon exposure to short-wave ultraviolet (UV or UVC) radiation and/or heat. These polymers can be degraded by a laser as well in some embodiments. Polymers such as this include at least one type of repeat unit having light- or heat-sensitive bonds. Examples of light-sensitive monomers that can be used to form these repeat units can include dimers of resveratrol or coumarin, cinnamic esters, and substituted derivatives thereof. An example of a heat-sensitive monomer is a Diels-Alder adduct of a maleimide and a furan. Light-sensitive and heat-sensitive degradable shells are discussed in greater detail with respect to FIG. 6. Further, in some embodiments the degradable shell can be made of a polyamic acid (PAA). Examples of degradable PAA shells are discussed in greater detail with respect to FIGS. 4A-5.

Degradable microcapsules are then prepared from the selected polymerizing agent and degradable polymer. This is illustrated at step 130. Techniques for microcapsule formation can include emulsion and electrospray techniques. These techniques are discussed in greater detail with respect to FIGS. 5 and 6, respectively. In some embodiments, the rupturable microcapsules have diameters of about 20 µm-200 µm. However, the microcapsules can be any appropriate size (e.g., approximately 10 µm-1000 µm in diameter). In other embodiments, the microcapsules can be nanoscale capsules having diameters between about 10 nm and 1000 nm.

Figure 2:
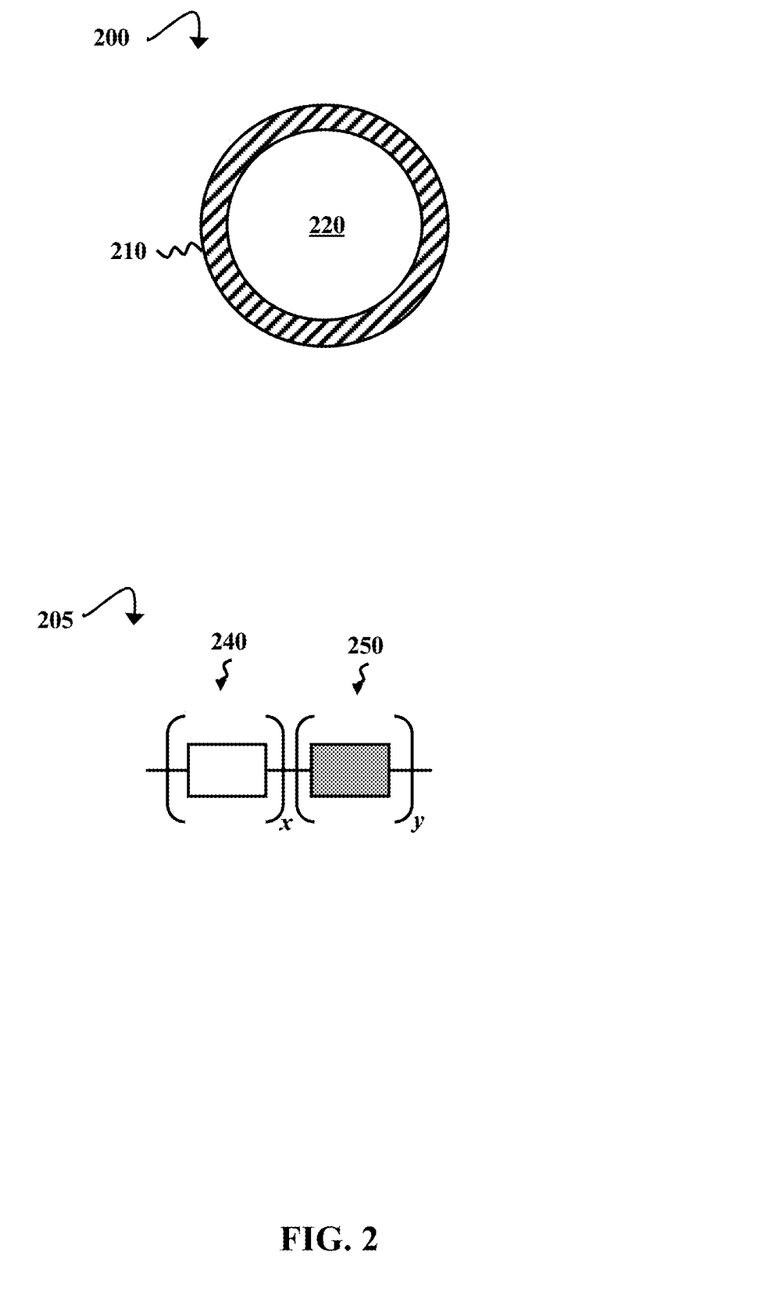
FIG. 2 illustrates schematic diagrams showing a generic example of a microcapsule and a generic example of the microcapsule's shell polymer, according to some embodiments of the present disclosure.

The size of the microcapsules can be varied by adjusting factors such as stir speed, temperature, and/or concentration during their formation. The microcapsules can be spherical or approximately spherical, depending upon the materials and reaction conditions used in their formation. Various techniques known to persons of ordinary skill in the art can be used to adjust shell thickness, size distribution, and other properties of the microcapsules. An example of a rupturable microcapsule is illustrated in FIG. 2.

The microcapsules formed in process 100 can be combined with various polymeric materials in order to form self-healing materials or to reduce porosity. For example, the microcapsules can be used to reduce porosity in materials formed via selective laser sintering (SLS). This is discussed in greater detail with respect to FIG. 1B. Additionally, heat- and/or light-sensitive microcapsules can be used to release polymerizing agents in applications other than laser sintering (e.g., to fill in other porous materials, to supplement polymerizing agents encapsulated by mechanically rupturable microcapsules, etc.).

Figure 1B:
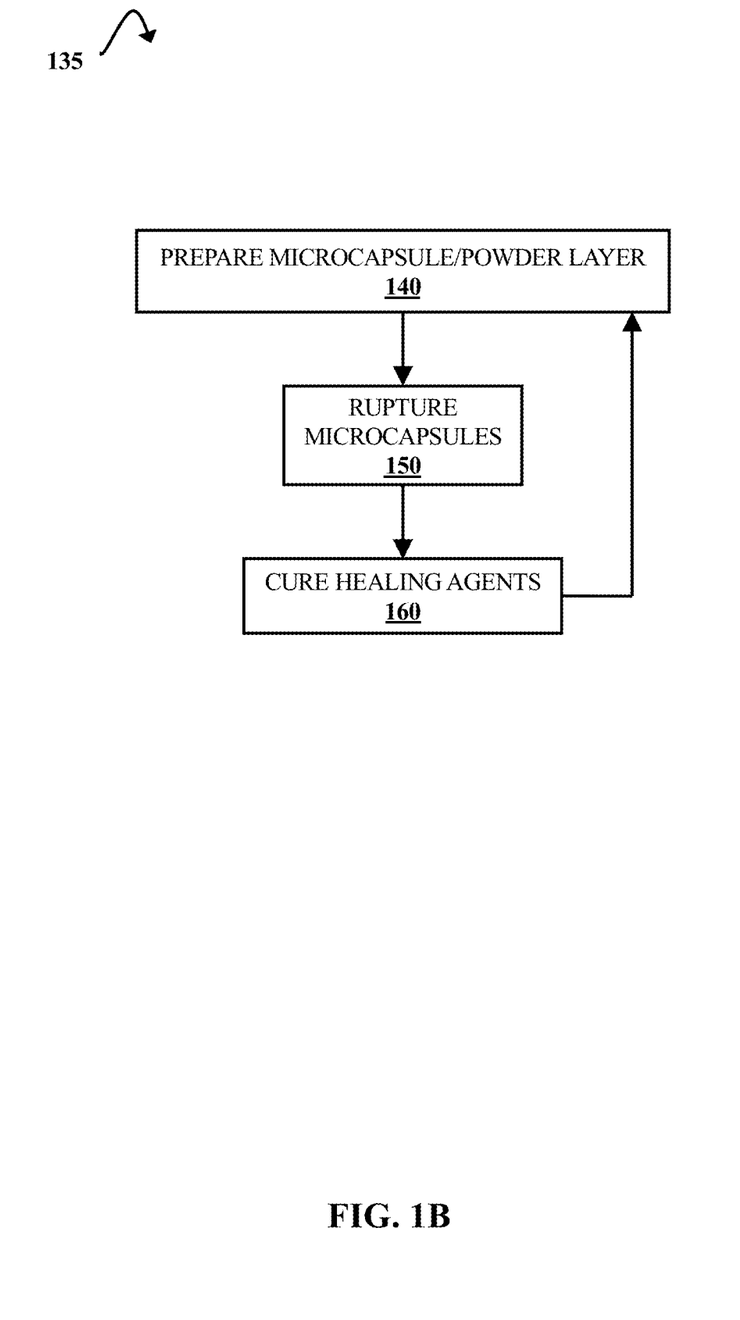
FIG. 1B is a flow diagram illustrating a process of reducing a material's porosity using polymerizing agents encapsulated by rupturable microcapsules, according to some embodiments of the present disclosure.

FIG. 1B is a flow diagram illustrating a process 135 of reducing a material's porosity using polymerizing agents encapsulated by rupturable microcapsules, according to some embodiments of the present disclosure. A single layer of rupturable microcapsules combined with a powder for SLS is prepared. This is illustrated at step 140. The layer is prepared by depositing a mixture of rupturable microcapsule and SLS powder onto the bed of an SLS machine. The rupturable microcapsules can be microcapsules prepared in process 100 (FIG. 1A). The powder can be any particles appropriate for use in SLS. These SLS powder particles can be made of materials such as polyamides (PA) (e.g., PA-6, PA-11, PA-12, etc.), polyether ether ketones (PEEK), thermoplastic elastomers, polyurethanes, polyether block amides (PEBA), polycarbonates, polystyrenes, etc. However, other materials can be used (e.g., polypropylene, polyethylene, acetonitrile butadiene styrene (ABS), metals, ceramics, etc.).

Figure 3A:
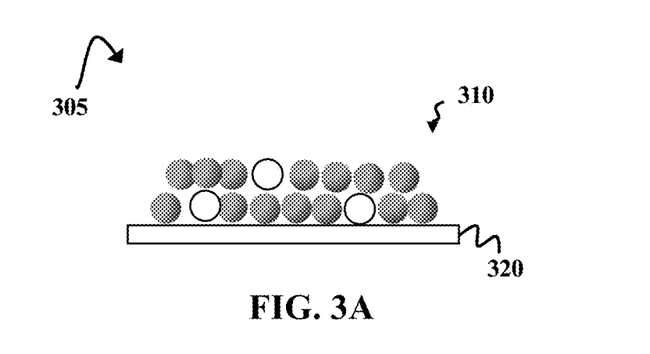
FIGS. 3A-3C are schematic diagrams illustrating a selective laser sintering (SLS) environment, according to some embodiments of the present disclosure.

In some embodiments, the layer has a thickness of approximately 0.20 mm. However, the layer can have any appropriate thickness (e.g., about 0.10 mm-0.30 mm). In some embodiments, the weight percent (wt %) of the microcapsules in the layer is about 2.5 wt % or about 5 wt %. However, other microcapsule concentrations can be used (e.g., about 1-2.5 wt %, about 2.5-5 wt %, or about 5-10 wt %). Microcapsules having approximately the same diameters (e.g., about 20 µm-200 µm) as the particles of SLS powder can be used. Microcapsules of different sizes can be used in other embodiments. An example of a microcapsule/SLS powder layer is illustrated in FIG. 3A.

A laser is rastered across areas of the deposited layer, and the microcapsules in the deposited layer are ruptured. This is illustrated at step 150. Before the laser is applied, the temperature of the deposited layer of microcapsules and SLS powder is raised to just below the SLS powder particles' melting point. Degradable microcapsules having decomposition onset temperatures above the melting point of the SLS powder particles can be selected at step 140 in order to prevent the shells from rupturing before the laser sintering has begun. The laser fuses the SLS particles according to a pattern from a computer-aided design (CAD) file. In some embodiments, the laser is a carbon dioxide ($CO_2$) laser, though other lasers can be used as well (e.g., Nd:YAG lasers, fiber lasers, etc.). Laser power and other parameters can vary, and are selected according to conventional SLS parameters. For example, a laser power between about 9 W and 15 W can be used to sinter PA-12 particles in some embodiments.

The laser can also cause the degradable microcapsules in the sintered layer to rupture. When the degradable shells of the microcapsules include light- or heat-sensitive polymers, further microcapsule shell degradation can be accomplished by application of UV light at appropriate wavelengths (e.g., below about 280 nm) and/or heat (e.g., approximately 140-180° C.). In some embodiments, the light- and/or heat-degradable shells are not ruptured by the laser. The microcapsules can instead be ruptured by UV light or heat, respectively, after the laser sintering has occurred. The ruptured microcapsules release their encapsulated polymerizing agents into pores in the surrounding sintered material.

The released polymerizing agents form polymers in the pores, which are then cured. This is illustrated at step 160. Curing solidifies, hardens, and/or toughens the polymers formed within the pores. For example, curing can facilitate formation of crosslinking bonds in a polymer. The curing can be accomplished by application of UV radiation, heat, and/or other curing agents, depending upon the type of polymerizing agent and/or sintered material. In some embodiments, the curing can occur without application of heat and/or UV radiation. For example, polymerizing agents that form suitable polymers without an additional curing agent can be used. In these instances, the curing step can be waiting a suitable amount of time to allow the polymer to solidify within the pores of the sintered layer. Additionally, the curing agent can be a chemical compound (e.g., vinyl-functionalized silicon dioxide ($SiO_2$)) released from different ruptured microcapsules in the layer. However curing agents can be added in other ways. For example, microcapsules can be double-walled, wherein each capsule contains a polymerizing agent and another healing or curing agent separated by a rupturable inner wall. These and other techniques for polymerization and curing are known to persons of ordinary skill in the art.

When the pore-filling polymer has cured, the bed of the SLS machine is lowered by the thickness of one layer. Process 135 then returns to step 140, and a next layer of the SLS powder and rupturable microcapsule mixture is deposited onto the sintered layer. Process 135 repeats steps 140-160 until the SLS machine has completed printing the design provided by the CAD file or received instructions to stop. After a cooling period (e.g., to room temperature), the printed object is removed from the SLS machine platform.

FIG. 2 illustrates schematic diagrams showing a generic example of a microcapsule 200 and a generic example of the microcapsule's shell polymer 205, according to some embodiments of the present disclosure. The microcapsule 200 is an example of a rupturable microcapsule prepared in process 100 (illustrated in FIG. 1A). The rupturable microcapsule 200 includes a degradable shell 210 encapsulating a polymerizing agent 220 (e.g., a monomer, an initiator or catalyst, and/or a solvent). The shell polymer 205 is a generic example of a degradable copolymer from which the shell 210 can be made. The shell polymer 205 is a copolymer with two different types of monomer repeat units, which are represented by a white box (x block) 240 and a gray box (y block) 250, where x and y are each integers greater than 1.

In some embodiments, the x block 240 and/or y block 250 monomers are photo- or heat degradable. However, the shell 210 can be made of any polymer that can be degraded by a laser, such as a laser from an SLS machine. Examples of these polymers are discussed in greater detail with respect to FIG. 1A. The polymer 205 can be a block copolymer or another type of copolymer (e.g., an alternating or random copolymer). In some embodiments, the polymer 205 can include more than two types of monomer (see, e.g., FIG. 4B). In other embodiments, the polymer 205 is a homopolymer (where x or y=0). Further, the polymer 205 can be a crosslinked network of monomers and, optionally, additional cros slinking molecules.

Figure 3B:
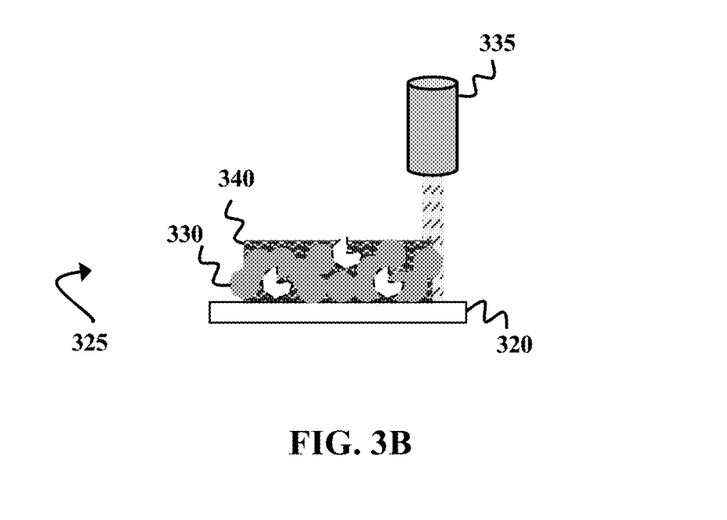
Figure 3C:
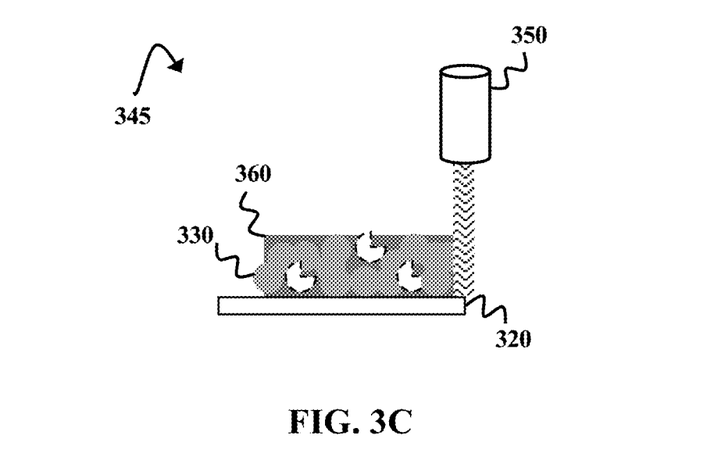

FIGS. 3A-3C, are schematic diagrams illustrating a selective laser sintering (SLS) environment, according to some embodiments of the present disclosure. FIG. 3A illustrates a prepared layer 305 of particles 310 on an SLS machine bed 320. This layer can be prepared according to the processes of step 140 of process 135 (FIG. 1B). The particles 310 include SLS powder particles (gray spheres) and rupturable microcapsules (white spheres). In some embodiments, the layer 305 is approximately 0.2 mm thick, and the particles 310 include PA-12 SLS particles combined with rupturable microcapsules (e.g., ~2.5-5 wt %). Each microcapsule contains a polymerizing agent. For example, each microcapsule can contain a solvent-based polymerizing agent. In another example, the layer 305 can have a mixture of two sets of microcapsules, one set encapsulating DCPD and the other set encapsulating a catalyst such as Grubbs' catalyst, Shrock's catalyst, or tungsten(VI) hexachloride with diethylaluminum chloride ($WCl_6/Et_2AlCl$).

FIG. 3B illustrates a layer 325 of sintered material 330 on the SLS machine bed 320. The sintered material 330 is prepared by rastering a laser source 335 over regions of the prepared layer 305 (FIG. 3A) according to a pattern from an input CAD file. This results in fusion of the SLS powder (gray) and rupture of the microcapsules (white) exposed to laser energy from the laser source 335. Rupture of the microcapsules releases the encapsulated materials, thereby filling accessible pores in the sintered material 330 with polymerizing agents 340. For example, the released polymerizing agents 340 can include DCPD and Grubbs' catalyst, which can react to form poly-DCPD in the pores of the sintered material 330.

FIG. 3C illustrates a layer 345 of the sintered material 330 filled in with a polymer 360 formed by the polymerizing agents 340 (FIG. 3B) on the SLS machine bed 320. The polymerizing agents 340 are cured by an energy source 350, forming a solid polymer 360 that seals the pores in the sintered material 330. The energy source 350 is moved or reflected across the sintered layer 345. The energy source 350 can be attached to the same scanning system as the laser source 335 (FIG. 3B), or it can be independent of the laser source 330. The energy source 350 is selected based on the types of polymer 360 and sintered material 330 in the layer 345. For example, the energy source 350 can provide short-wave (e.g., ~250 nm) UV radiation, heated air, infrared radiation, etc. Additional techniques for curing the polymer 360 are discussed in greater detail with respect to FIG. 1B.

Figure 4A:
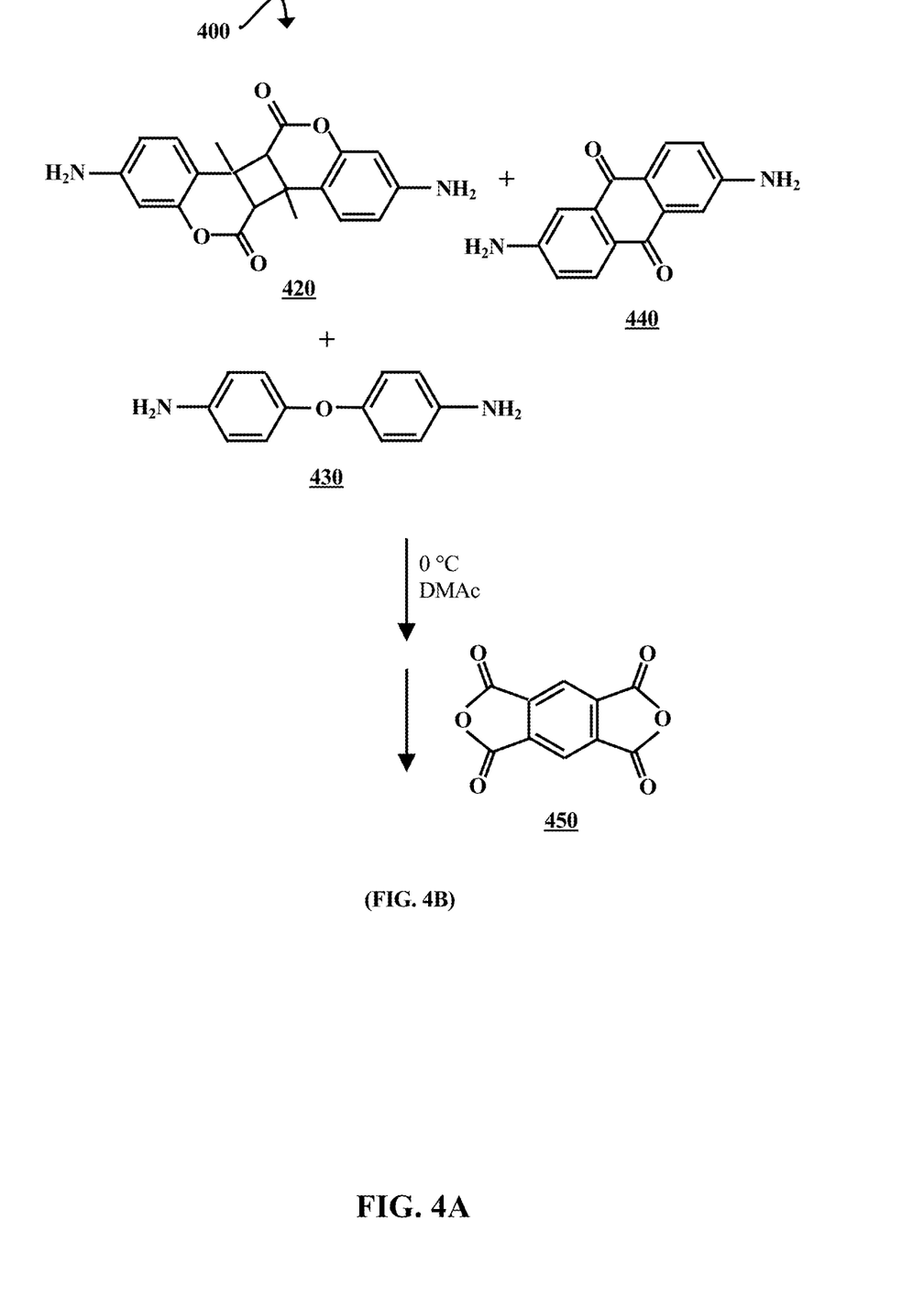
FIG. 4A is a chemical reaction diagram illustrating a process of forming a degradable polyamic acid (PAA), according to some embodiments of the present disclosure.

FIG. 4A is a chemical reaction diagram illustrating a process 400 of forming a degradable polyamic acid (PAA), according to some embodiments of the present disclosure. The PAA can be used to form a degradable microcapsule shell. A solution of a diamino coumarin dimer 420, 4,4'-oxydianiline (4,4'-ODA) 430, and 2,6-diaminoanthraquinone (2,6-DAAQ) 440 in N,N'-dimethylacetamide (DMAc) is prepared, and then cooled to about 0° C. Pyromellitic dianhydride (PMDA) 450 is added to the solution, which is then stirred until a viscous solution forms (e.g., for approximately 6 hours). The product of this reaction is illustrated in FIG. 4B.

Figure 4B:
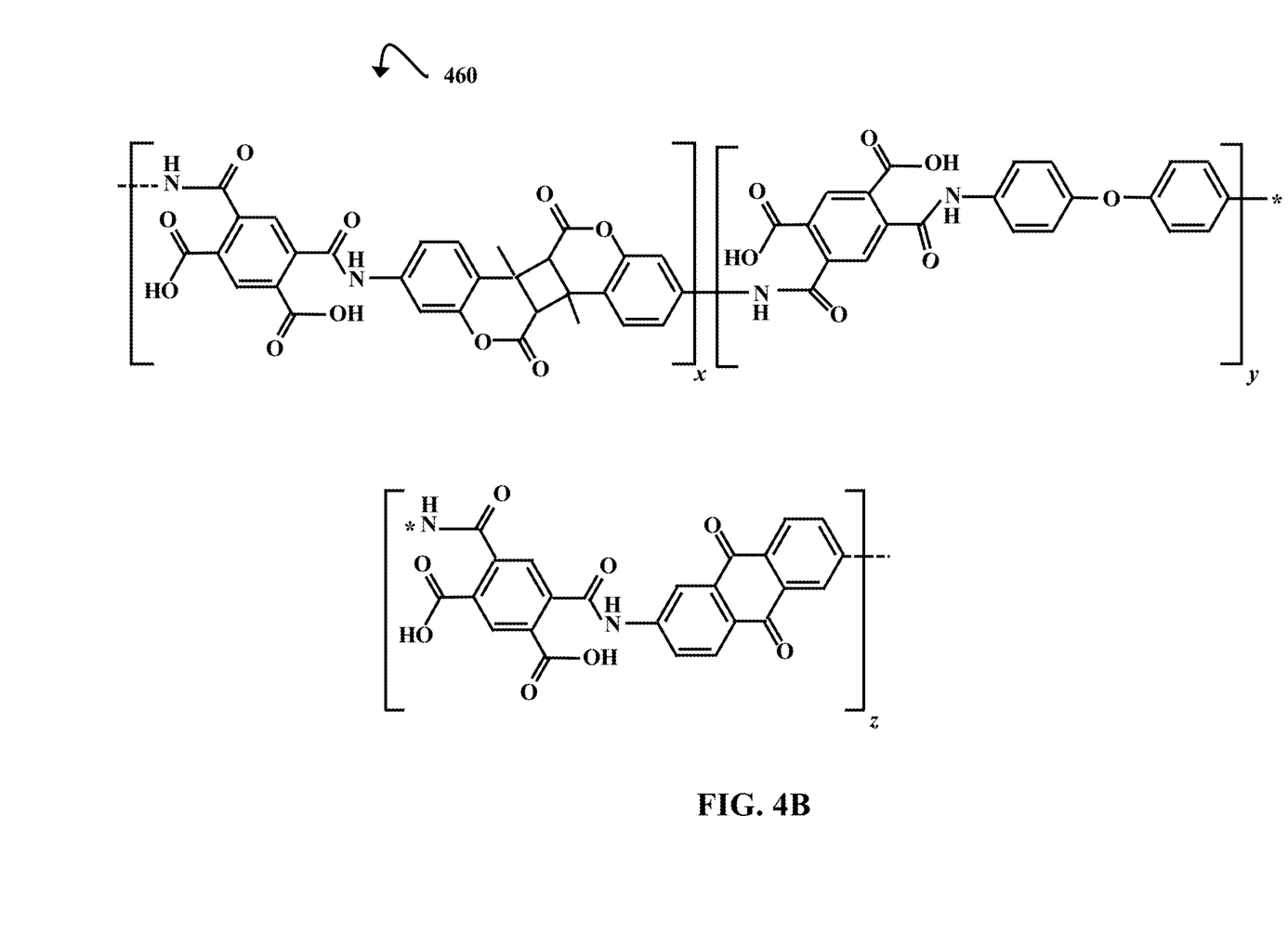
FIG. 4B is a chemical structure diagram illustrating a degradable PAA, according to some embodiments of the present disclosure.

FIG. 4B is a chemical structure diagram illustrating a degradable PAA 460, according to some embodiments of the present disclosure. The degradable PAA 460 is formed in process 400 (FIG. 4A), and can be stored as a viscous solution at about −20° C. The degradable PAA 460 includes three repeat units, where x, y, and z are integers greater than 1. For example, each of x, y, and z can independently be an integer between 1 and 1,000,000 (e.g., about 1-25,000, about 500-25,000, about 1,000-25,000, about 2,000-25,000, about 5,000-25,000, about 25,000-50,000, about 50,000-500,000, etc.). The starred bond in the y block represents a bond to the starred nitrogen atom in the z block.

The coumarin dimer repeat unit (x) is light-sensitive, and allows the polymer to degrade when exposed to UV light at or below approximately 255 nm. In some embodiments the degradable PAA 460 is a low-molecular weight PAA. For example, the number average molecular weight ($M_N$) of the degradable PAA 460 can be between about 4,000 g/mol and 6,000 g/mol. However, in some embodiments the degradable PAA 460 has another value of $M_N$ (e.g., ~250 g/mol-450 g/mol, ~450 g/mol-700 g/mol, ~700 g/mol-2,000 g/mol, ~2,000 g/mol-15,000 g/mol, etc.). Higher molecular weights can also be obtained in other embodiments, such as above approximately 25,000 g/mol (e.g., ~25,000-100,000 g/mol).

By adjusting the ratios of diamine monomers (4,4'-ODA, 2,6-DAAQ, and diamino coumarin dimer) in process 400, the lengths of the x, y, and z blocks can be varied relative to one another. Additionally, if 4,4'-ODA and/or 2,6-DAAQ are left out of process 400, an analogous photodegradable PAA, where y and/or z=0, can be formed. Further, a non-photodegradable PAA, where x=0, can be formed if the light-sensitive diamino coumarin dimer is omitted from process 400. In these instances, microcapsule shells made from the non-photodegradable PAA can be ruptured by laser energy. Further, alternative diamine monomers (not shown) can be used in order to form PAA microcapsules having different mechanical and/or chemical properties.

Figure 5:
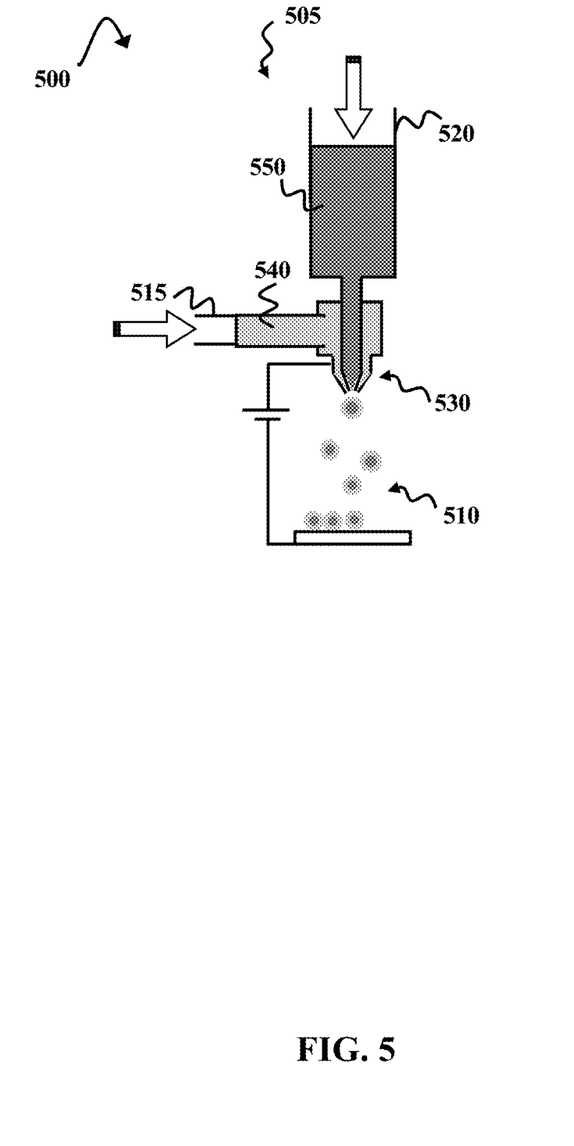
FIG. 5 is a schematic diagram illustrating an example of a rupturable PAA microcapsule formation environment, according to some embodiments of the present disclosure.

FIG. 5 is a schematic diagram illustrating an example of a rupturable PAA microcapsule formation environment 500, according to some embodiments of the present disclosure. A high-voltage (e.g., ~5 kV-50 kV) electrostatic spinning machine 505 is used to prepare PAA microcapsules 510 via electrospray techniques. The high-voltage electrostatic spinning machine 505 includes a first syringe 515 and a second syringe 520, both of which are connected to a coaxial nozzle 530 having inner and outer nozzle diameters of about 0.8 mm and 1.6 mm, respectively. A solution of a degradable PAA (~18 wt % in DMAc) 540, such as the degradable PAA 460 illustrated in FIG. 4B, is placed in the first syringe 515, and a polymerizing agent 550 is placed in the second syringe 520. The polymerizing agent 550 can be a liquid polymerizing agent or a solution containing a polymerizing agent.

Examples of polymerizing agents that can be used are discussed in greater detail with respect to FIG. 1A.

The degradable PAA solution 540 is extruded through the outer nozzle of the coaxial nozzle 530 at a rate of about 1.250 mL/h while the polymerizing agent 550 is extruded through the inner nozzle of the coaxial nozzle 530 at a rate of about 0.375 mL/h. A voltage of about 20 kV is applied to the extruded materials 540 and 550, resulting in the formation of microcapsules 510 having degradable PAA 540 shells and polymerizing agent 550 cores. The microcapsules 510 are removed from the electrostatic spinning machine 505, and heated in an oven (not shown) at about 170° C. The heating causes the PAA shells of the microcapsules 510 to imidize, thereby forming thermally stable microcapsules having polyimide shells (not shown). Herein, "thermally stable" indicates that the microcapsules have decomposition onset temperatures of about 350° C.-400° C. or higher. The thermally stable microcapsules can be combined with SLS powder to form a particle layer (see, e.g., FIG. 3A) at step 140 of process 135 (FIG. 1A).

Figure 6:
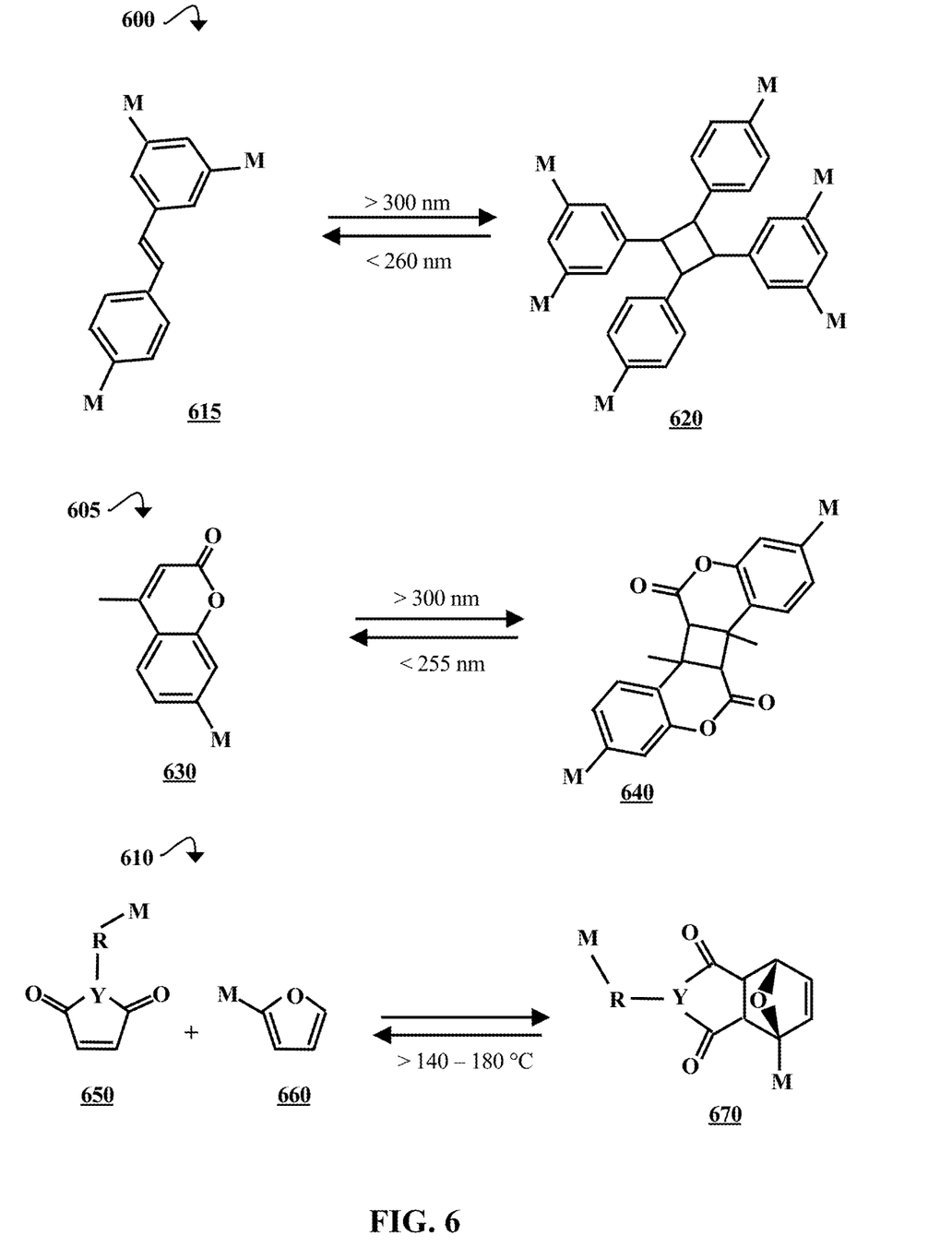
FIG. 6 is a chemical reaction diagram illustrating reactions of degradable molecules that can be used to form degradable shells, according to some embodiments of the present disclosure.

FIG. 6 is a chemical reaction diagram illustrating reactions 600, 605, and 610 of degradable molecules that can be used to form degradable shells, according to some embodiments of the present disclosure. Processes 600, 605, and 610 involve the formation of compounds that can be degraded in light- or heat-activated reactions. Degradable polymers for microcapsule shells such as the shell 210 illustrated in FIG. 2 can be formed by polymerizing these light- or heat-sensitive compounds, optionally with additional monomers. The microcapsule shells can then be produced via emulsion processes. Emulsion is discussed in greater detail below.

The compounds illustrated in FIG. 6 each have one or more functional groups represented by "M". M can be a functional group bound directly to an illustrated compound. However, M can also include a hydrocarbon bridging group (R) linking the M functional group to the illustrated compound. Examples of M groups can include hydroxyls (—OH or —ROH), amines (—NH$_2$ or —RNH$_2$), carboxylic acids (—COOH or —RCOOH), isocyanates (—NCO or —RNCO), acid chlorides (—COCl or —RCOCl), chloroformates (—OC(O)Cl or —ROC(O)Cl), vinyls (—CH=CH$_2$ or —RCH=CH$_2$), and epoxides (—C$_2$H$_3$O or —RC$_2$H$_3$O). However, M can represent any appropriate functional group (e.g., propylene carbonate, alkyl halides, esters, alkynes, etc.). In some embodiments, functional groups on one or more M group can result in shells having orthogonal functionality provided by these groups.

Examples of R bridging groups can include alkyl groups. Herein, "alkyl" refers to $C_1$-$C_{100}$ radicals, which can be linear, branched, or cyclic. In these instances, M can be a substituted analogue of an alkyl such as methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, cyclooctyl. In some embodiments, the alkyls are unsaturated (e.g., alkenes and alkynes). As used herein, the term "substituted" indicates that a hydrogen atom has been replaced with a carbon atom, a heteroatom, or a heteroatom-containing group. For example, a "substituted alkyl" is a radical made of carbon and hydrogen where at least one hydrogen is replaced by a carbon atom or a heteroatom (e.g., an oxygen or nitrogen atom). In the preceding M group examples, the functional groups are substituents that replace hydrogen atoms on the R bridging groups.

M can also be a substituted analogue of a cyclic alkyl group. When cyclic, the alkyl groups can be aromatic or non-aromatic. Herein, the term "aromatic" also refers to pseudoaromatic heterocycles, which are heterocyclic substituents that have similar properties and structures (nearly planar) to aromatic heterocyclic ligands, but are not by definition aromatic. Examples of cyclic aromatic alkyls (referred to herein as "aryl groups") that can be used can include six-carbon aromatic rings (phenyl) and substituted variants thereof (e.g. 2-methyl-phenyl, xylyl, tolyl, etc.), $C_4$-$C_{60}$ aromatic rings, $C_4$-$C_{20}$ aromatic rings, etc. The cyclic groups can optionally include heteroatoms (e.g., nitrogen, oxygen, or sulfur) replacing at least one carbon atom in the cyclic structure.

In process 600, resveratrol 615 is dimerized in the absence of electromagnetic radiation having wavelengths shorter than about 300 nm. That is, dimerization is carried out under light having wavelengths longer than approximately 300 nm (e.g., visible and/or long-wave UV light). Herein, "resveratrol" refers to both unsubstituted resveratrol (3,5,4'-trihydroxy-trans-stilbene) and its functionalized derivatives. The dimerization produces a resveratrol dimer 620 that can be retro-dimerized by exposure to electromagnetic radiation at wavelengths below about 260 nm. In process 605, a coumarin derivative 630 (e.g., 7-amino-4-methylcoumarin) is dimerized in the absence of electromagnetic radiation having wavelengths shorter than about 300 nm. The resulting compound, referred to herein as a "coumarin dimer 640", can be retro-dimerized by exposure to electromagnetic radiation at wavelengths below about 255 nm. In some embodiments, similar reversable dimers (not shown) can be formed from cinnamic esters or various stilbenoids. The photosensitive dimers can be used to form photodegradable microcapsule shells (see below).

In process 610, a maleimide 650 and a furan 660 are reacted in a Diels-Alder reaction to form an adduct 670. The maleimide 650 and the furan 660 each have M groups, which are independently selected from the aforementioned M groups. M groups without R bridging groups are not selected for the maleimide 650. An R bridging group on the maleimide 650 is illustrated separately from the M group in FIG. 6 in order to indicate that M groups on the maleimide 650 each include a hydrocarbon bridging group. It should be noted however that the M group on the furan 660 can optionally include an R bridging group as well. The maleimide 650 also includes a heteroatom represented by "Y". Y is an oxygen atom or a nitrogen atom. The reaction to form the adduct 670 is carried out under appropriate Diels-Alder reaction conditions, which are known to persons of ordinary skill in the art. The reaction can be reversed by heating the adduct 670 to about 140-180° C. or greater. Therefore, the heat-sensitive adduct 670 can be used to form heat-degradable microcapsule shells.

The degradable compounds 620, 640, and 670 can be used to form rupturable microcapsule shells using emulsion techniques. The emulsion techniques are not illustrated in FIG. 6. However, the following is an example emulsion procedure: An aqueous solution containing about 2.5 wt % ethylene maleic anhydride (EMA) is prepared, and stirred at room temperature. Urea (e.g., to a final concentration of about 20 g/L), ammonium chloride (e.g., to about 2 g/L), and a degradable compound 620, 640, or 670 (e.g., to about 2 g/L) are then dissolved in the EMA solution at room temperature. A solution of sodium hydroxide (e.g., ~10 wt %) is then added until the solution reaches approximately pH 3.5. A small amount of 1-octanol (e.g., a few drops per liter) can be added to the solution in order to eliminate surface bubbles. A selected polymerizing agent (e.g., DCPD) is then dispersed in the aqueous phase to form an emulsion. Examples of polymerizing agents that can be used are discussed in greater detail with respect to FIG. 1A.

The emulsion is allowed to stabilize for about 10 min. Then, a formaldehyde solution (~37 wt %) is added to the emulsion to obtain an approximately 1:2 ratio of formaldehyde to urea. The reaction vessel is then covered, and the emulsion is heated to about 55° C. at a rate of about 1° C./min. The emulsion is agitated in a mixer for about 4 hours at this temperature, and then cooled to ambient temperature when the agitation has ended. This results in a suspension of rupturable microcapsules, which encapsulate droplets of the polymerizing agent in shells formed by crosslinking the degradable compounds 620, 640, or 670. The microcapsule suspension is then filtered (e.g., with a coarse-fritted filter). The filtered microcapsules can be rinsed with deionized water, and air dried (e.g., for about 24 h-48 h).

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 25° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"). Unless otherwise indicated, modifying terms such as "about," "approximately," and "~" indicate +/−10% of a recited value, range of values, or endpoints of one or more ranges of values.

The processes discussed herein and their accompanying drawings are not to be construed as limiting. One skilled in the art would recognize that a variety of techniques may be used that vary in conditions, components, methods, etc., which ultimately generate rupturable microcapsules in porous materials. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may encapsulate polymerizing agents in rupturable microcapsules, and a second entity may fill in pores in laser-sintered materials using these microcapsules.

What is claimed is:

1. A method, comprising:
   depositing a layer, the layer comprising a set of particles and a set of microcapsules encapsulating polymerizing agents;
   fusing, by a laser, particles from the set of particles, wherein the fused particles are in selected areas of the layer; and
   rupturing, by an energy source, at least one portion of microcapsules from the set of microcapsules, wherein the energy source is at least one energy source selected from the group consisting of the laser, an ultraviolet (UV) radiation source, and a heat source.

2. The method of claim 1, wherein the UV radiation source exposes the at least one portion of microcapsules to electromagnetic radiation having a wavelength below approximately 260 nm.

3. The method of claim 1, wherein the heat source heats the at least one portion of microcapsules to a temperature of approximately 140° C.-180° C.

4. The method of claim 1, wherein the rupturing the at least one portion of microcapsules releases the polymerizing agents into pores in the selected areas of the layer.

5. The method of claim 4, further comprising curing the released polymerizing agents.

6. The method of claim 1, wherein each particle in the set of particles has a diameter between approximately 20 μm and 200 μm.

7. The method of claim 1, wherein each microcapsule in the set of microcapsules has a diameter between approximately 20 μm and 200 μm.

8. The method of claim 1, wherein fusing comprises rastering a laser over the selected areas of the layer according to a pattern from a computer-aided design (CAD) file.

9. The method of claim 1, wherein the weight percent of the set of microcapsules in the layer is in a range of approximately 2.5-5 wt %.

10. The method of claim 1, wherein the layer has a thickness of approximately 0.20 mm.

\* \* \* \* \*